United States Patent Office 3,709,921
Patented Jan. 9, 1973

3,709,921
METHOD OF FORMING DICYANO COMPOUNDS
William C. Baird, Jr., Westfield, and John H. Surridge, Scotch Plains, N.J., assignors to Esso Research and Engineering Company
No Drawing. Filed Sept. 3, 1969, Ser. No. 855,025
Int. Cl. C07c *121/26*
U.S. Cl. 260—465.3     9 Claims

ABSTRACT OF THE DISCLOSURE

Dicyano compounds are prepared by reacting a conjugated diolefin and cuprous cyanide with molecular iodine or cupric bromide in the presence of an inert aliphatic, aromatic, or chlorocarbon diluent, e.g., carbon tetrachloride. The preparation of dicyano compounds in inert hydrocarbon or chlorocarbon diluents leads to isolation of the dicyano compounds as a cuprous halide complex and thus makes possible the regeneration and recycle of the diluent and metal salts employed in the reaction mixture. Dicyano compounds may be converted to dibasic acids by hydrolysis or to diamines by hydrogenation and thus find use in both the chemical and polymer industries.

BACKGROUND OF THE INVENTION

This invention relates to the formation of monoolefinic dicyano compounds. More particularly, this invention relates to the formation of monoolefinic dicyano compounds wherein a conjugated diolefin is reacted with cuprous cyanide and molecular iodine or cupric bromide in the presence of $C_5$ to $C_{20}$ aliphatic, aromatic or alkyl aromatic hydrocarbon or in the presence of a $C_1$ to $C_4$ chlorinated hydrocarbon, e.g., carbon tetrachloride. In a particularly preferred embodiment, a conjugated diolefin is reacted with molecular iodine and cuprous cyanide in an inert paraffinic hydrocarbon diluent In an alternative embodiment of this invention, monoolefinic dicyano compounds are prepared by reacting a conjugated diolefin with cupric bromide and cuprous cyanide in the presence of inert paraffinic-type hydrocarbon or chlorocarbon diluent.

DESCRIPTION OF THE PRIOR ART

The preparation of dicyano compounds has normally been effected by utilizing the dihalo compounds as intermediates. The dihalo compounds are formed by treating an excess olefinic material with a limited amount of a halogen or by reacting equal molar amounts of halogen and olefin in an inert solvent. These procedures suffer from the disadvantages of handling large amounts of corrosive and toxic materials and competing side reactions such as the formation of allylic and vinylic halides and polyhalogenated compounds. Another procedure for forming the dihalo intermediates involves reacting an olefin with a variable valence metal halide whereby the metal halide is reduced to a lower oxidation state, thereby yielding halogen atoms which react at the olefinic bond. This process suffers from the utilization of high temperatures required to volatilize the unsaturated feedstock and also the necessity of utilizing a supported, e.g., alumina, catalyst. Thus, the two-step process for the preparation of dicyano compounds necessarily incorporates all the disadvantages of the prior art halogenation process in addition to the loss of halides in that the halides are irreversibly degraded to non-regenerable inorganic by-products.

The second step in the two-step process for the formation of dicyano compounds normally involves reacting the dihalide with a metal cyanide in an alcohol medium. However, the use of an alcohol solvent as is disclosed in U.S. 2,342,101, which is not inert to either the diiodo or dibromo butenes, results in the solvolysis of these materials in the alcoholic media to form dialkoxybutenes as undesired by-products. Furthermore, the use of metal cyanides, e.g., sodium cyanide, potassium cyanide and the like, to form dicyano compounds from a dihalide intermediate leads to the formation of the respective metal halides, e.g., sodium chloride, as an inorganic by-product. These salts are incapable of facile conversion to the halogen and metal cyanide, thus preventing the recovery of the halogen and metal salt in a state that can be regenerated and recycled to the reaction zone. Consequently, the halogen is irreversibly transformed to the halide anion and is lost to the system. Furthermore, these procedures and succeeding processes have the disadvantage of low overall yields based on diolefins.

The dicyano compounds, such as dehydroadiponitrile, find use in both the chemical and polymer industries. Hydrogenation of the dicyano compounds results in the formation of diamines, whereas the hydrogenation of the olefinic bond followed by hydrolysis converts the dicyano compounds to dibasic acids. Such products find usefulness as fiber monomers and for chemical processes.

SUMMARY OF THE INVENTION

It has now been discovered that monoolefinic dicyano compounds may be selectively prepared in high yields by reacting a conjugated diolefin with cuprous cyanide and a halogen selected from the group consisting of cupric bromide and molecular iodine in the presence of an inert diluent selected from the group consisting of aliphatic, aromatic, or chlorinated hydrocarbons and mixtures thereof. The reaction is conducted at a temperature in the range of from about 25° to about 300° C. and at a pressure in the range of from about atmospheric to about 500 p.s.i.g. In a preferred embodiment of this invention, a $C_4$ to $C_{20}$ conjugated diolefin is reacted with cuprous cyanide and molecular iodine in the presence of an inert diluent selected from the group consisting of aliphatic, aromatic or chlorinated hydrocarbons and mixtures thereof. In another preferred embodiment, $C_4$ to $C_{20}$ conjugated diolefins are reacted with cupric bromide and cuprous cyanide in the presence of an inert diluent selected from the group consisting of aliphatic, aromatic or chlorinated hydrocarbons for a period of time sufficient to form monoolefinic dicyano compound in high selectivities. The above-described reactions are conducted in the liquid phase under mild conditions in the presence of a substantially anhydrous inert hydrocarbon or chlorinated hydrocarbon medium. The fact that the above-described reactions for the selective formation of monoolefinic dicyano compounds can be carried out in inert hydrocarbon and chlorocarbon diluents permits simplified separation and regeneration techniques to be employed in the separation of the dicyano compounds from the reaction products and the regeneration of the halogen source and the metal cyanide.

While not wishing to be bound by any particular theory, it is believed that the formation of the monoolefinic dicyano compounds in an inert hydrocarbon or chlorinated hydrocarbon diluent, in accordance with the instant invention, leads to the isolation of the dicyano compound as its cuprous halide complex in accordance with the following equation:

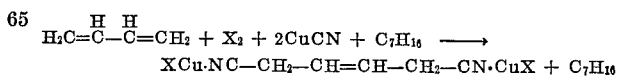

wherein X equals bromine or iodine. Thus, when butadiene is employed as the conjugated diolefin, heptane as the inert hydrocarbon diluent and molecular iodine as the halogen source, in accordance with the above reaction, the cuprous halide complex formed is bis-(cuprous iodide) 1,4-dicyanobutene-2. When cupric bromide is employed as the halogen source, in conjunction with butadiene, cuprous cyanide and heptane as described above, the cuprous halide complex formed is bis-(cuprous bromide) 1,4-dicyanobutene-2.

The formation of the above-described dicyano-cuprous halide complexes permits simplified separation techniques to be employed to isolate the dicyano compound product in high selectivities. In addition, the metal halide salts can be regenerated to yield the halogen source and cuprous cyanide which can be recycled back to the reaction mixture. Thus, the halogen and cuprous cyanide is made available for the continuous reaction with the conjugated diolefin compounds. The use of the aliphatic, aromatic and chlorinated hydrocarbon diluents allows for the formation of this dicyano-metal halide complex and permits the simplified separation and regeneration techniques to be employed. Representative examples of such extraction and regeneration techniques employed in conjunction with the formation of the dicyano-metal halide complex include: (a) extraction with water and separation of the dicyano compound from the metal salt by filtration followed by converting the recovered salt by air oxidation and reaction with hydrogen cyanide to release free halogen and regenerate the metal cyanide, e.g., cuprous cyanide; (b) treatment of the dicyano-metal halide complex with a metal cyanide, e.g., sodium cyanide, to release the dicyano compounds and convert the metal halide to a metal cyanide; and (c) treating the suspension of the dicyano-metal halide complex with hydrogen cyanide, extracting the dicyano compound from the inert diluent, and separating the metal cyanide by filtration in a form which can be regenerated for recycle back to the reaction zone. In this latter embodiment, if iodine were the source of halogen in the reaction, the iodine is recovered by the air oxidation of the hydrogen iodide. However, if bromine were the source of halogen in the form of cupric bromide, the addition of cuprous bromide and air regenerates cupric bromide for recycle to the reaction zone for the continued synthesis of the monoolefinic dicyano compounds.

In addition, the reaction of the instant invention may be performed in blends in the above-described diluents. Representative, non-limiting examples of such blends of aromatic, aliphatic or chlorinated hydrocarbon diluents include but are not limited to the following: heptane-chloroform, heptane-benzene, benzene-carbon tetrachloride, and heptane-benzene-chloroform. The composition of the binary solvent blends consist of approximately equal volume percentages for each solvent, i.e., 40 to 60 volume percent for each diluent component in a binary system, and about 30 volume percent for each component in a three-component blend.

Thus, it is clear that the applicants have discovered a novel one-step process for the continuous preparation of dicyano compounds wherein the reaction does not irreversibly degrade the halogen so that it is lost to the system and wherein the use of cuprous cyanide provides a method for the facile recovery and regeneration of these reagents back to the initial reaction zone.

The inert diluents which are believed to provide for the formation of the dicyano-metal halide complex and which are employed in the practice of the instant invention may be broadly characterized as aliphatic, aromatic or chlorinated hydrocarbons. It is to be understood that the use of inert hydrocarbons or chlorohydrocarbon diluents as described herein do not include those types of inert diluents commonly known as "coordinating ligand solvents." Preferred inert diluents of this invention include the halogenated hydrocarbons having from 1 to about 4 carbon atoms, such as chloroform, carbon tetrachloride, dichloroethane, hexachloroethane and the like; paraffinic hydrocarbons having from 5 to about 20 carbon atoms such as hexane, heptane, nonane, cyclohexane, cyclooctane, cyclododecane and the like and aromatic and alkyl substituted aromatic compounds having from 6 to about 12 carbon atoms, such as benzene. The most preferred inert diluents include: benzene, heptane, nonane, cyclohexane, chloroform and carbon tetrachloride.

When aromatic diluents, chlorocarbon diluents or blends of diluents including aromatic compounds or chlorocarbons are employed in the practice of this invention, the dicyano compound is recovered in solution free of its metal halide complex. Consequently, the dicyano compound need only be isolated by removal of the solvent, e.g., by distillation or evaporation and the recovered solvent is suitable for recycle back to the reaction zone.

The conjugated diolefins which can be employed in the practice of this invention may be substituted or unsubstituted conjugated diolefins containing from 4 to about 20 carbon atoms. Representative, nonlimiting examples of such compounds which can be employed in the practice of the instant invention include: butadiene, piperylene, isoprene, 2,3 - dimethylbutadiene-1,3, 1,1,4,4-tetramethylbutadiene, 1,3-cyclopentadiene, cyclohexadiene-1,3, cycloheptadiene-1,3, chloroprene, cyanoprene, and alkyl and aryl derivatives of these parent dienes.

Particularly preferred are the conjugated diolefins having from about 4 to about 12 carbon atoms. The most preferred starting conjugated diolefin compounds are butadiene, piperylene, isoprene, cyclopentadiene and chloroprene.

It has been found essential that in order to isolate the dicyano compounds as their cuprous halide complex and thus allow for the recovery and regeneration of the diluent, hydrogen halide and cuprous salt, to employ cuprous cyanide as the metal cyanide and either molecular iodine or cupric bromide as the source of halogen. While it is not fully understood, it is clear that only by employing cuprous cyanide in conjunction with molecular iodine and cupric bromide in the presence of an inert hydrocarbon or chlorocarbon diluent, will the cuprous halide complex of the dicyano compound be formed. As mentioned above, it is the formation of this complex which is believed to result in the regeneration and recycle of the reagents used in the instant process and thus result in a continuous process for preparing dicyano compounds.

Particularly advantageous are the reaction conditions under which this process may be effected. The temperature need only be such that the reaction takes place in the liquid phase. Thus, temperatures in the range of from about 25° to about 300° C., preferably 25° to 150° C., are employed in the practice of this invention. The reaction pressures can vary from about 15 to about 500 p.s.i.g., preferably from atmospheric to about 200 p.s.i.g. The reaction periods utilized can vary from a few minutes to several hours, with about 30 minutes to about 3 hours being preferred. The above-described conditions will normally result in conversions of the unsaturated feed in the range of from about 50 to about 100 mole percent, based upon halogen source, with selectivities (defined as the number of moles of desired product obtained over the number of moles of starting reagent consumed) to the formation of the desired dicyano compounds of at least 80 mole percent, and more preferably from 80 to about 99+ mole percent.

While the reaction may be carried out with stoichiometric equivalents of the reactants, an excess of the conjugated diolefin and metal cyanide may be charged to the reactor in order to insure complete utilization of the halogen source. Thus, the molar ratio of the metal cyanide and the unsaturated feed to the halogen employed is in the range of from about 2:1 to 100:1, preferably from 2:1 to 10:1. Likewise, the quantity of solvent employed in the reaction zone may vary over a wide range. Ordinarily, the solvent will constitute 40 to 90 weight percent, preferably 50 to 80 weight percent, of the reaction mixture. In preparing the reaction medium, care should be exercised to prevent the presence of excessive amounts of water. However, the presence of a water content of about 1 to 5 volume percent of the inert diluent volume can be tolerated. Preferably, the reaction is conducted in the substantial absence of water and more preferably, an anhydrous medium is employed.

This invention will be further understood by reference to the following examples:

EXAMPLE 1

Into a Parr Low Pressure Reactor were placed 25.4 grams (0.10 mole) of iodine, 18.0 grams (0.2 mole) of cuprous cyanide, and 100 ml. of n-heptane. The system was saturated and pressurized with butadiene to an initial pressure of 18 p.s.i.g. The reactor was rocked and heated at 50° to 60° C. for 5 hours; during this time the pressure rose to a maximum of 40 p.s.i.g. and then decreased. No iodine remained unreacted at the conclusion of the reaction period. The powdery cuprous iodide-dehydroa diponitrile complex was separated by filtration and airdried to give 46.4 grams of freely flowing powder (theoretical yield is 48.8 grams). Extraction of the complex with hot water gave 10.2 grams (87%) of 1,4-dicyanobutene-2 and 36.7 grams of cuprous iodide (theoretical yield is 38 grams). The dinitrile was recrystallized from methanol and sublimed to give while needles, M.P. 77° to 78° C. (lit. 76°). The infrared spectrum was identical to that of an authentic sample of dehydroadiponitrile (1,4-dicyanobutene-2). Vapor phase chromatography (2 ft. x ¼ in. 10% silanized polypropylene glycol column, 160° C., 250 ml./min. helium flow) showed the dinitrile to be 100% pure (retention time 2.8 min.). The NMR spectrum ($CDCl_3$) had the following pattern; $\delta$ 5.83 (m., 2, =CH); $\delta$ 3.18 (m., 4, —$CH_2CN$). This structure is consistent with that of dehydroadiponitrile and shows that the reaction product is isomerically pure.

The product was also subjected to a carbon, hydrogen, nitrogen analysis. It was found to contain 68.34 weight percent carbon, 5.92 weight percent hydrogen and 25.86 weight percent nitrogen. The product, 1,4-dicyanobutene-2, should contain 67.90 weight percent carbon, 5.70 weight percent hydrogen and 26.40 weight percent nitrogen.

EXAMPLES 2–8

In accordance with the procedure shown in Example 1, Examples 2–8 demonstrate that consistently high yields of dicyano-metal cyanide complex can be obtained independent of the reaction period. The yields of the isolated complex ranged from 90 to 95% of the theoretical yield.

TABLE I

| | Reaction time (hr.) | Complex yield (grams) |
|---|---|---|
| Example number: | | |
| 2 | 2.5 | 46.9 |
| 3 | 3.0 | 46.6 |
| 4 | 4.0 | 47.2 |
| 5 | 4.0 | 47.0 |
| 6 | 5.0 | 46.8 |
| 7 | 6.0 | 46.9 |
| 8 | 10.0 | 47.3 |

EXAMPLES 9–11

Examples 9–11 show that the use of recovered n-heptane as the diluent does not adversely affect the reaction. The procedure of Example 1 was followed except that heptane recovered from the filtration step was recycled into the Parr Reactor.

TABLE II

| | Reaction time (hr.) | Complex yield (grams) |
|---|---|---|
| Example number: | | |
| 9 | 4 | 47.6 |
| 10 | 5 | 47.7 |
| 11 | 10 | 47.8 |

EXAMPLE 12

The procedure of Example 1 was repeated using 100 ml. of carbon tetrachloride as the diluent. The reaction was heated at 50° to 60° C. for 3.5 hours. From the reaction was isolated 40.9 grams of cuprous iodide-dinitrile complex containing unreacted cuprous cyanide. Extraction of the complex with water gave 6.5 grams (61%) of dehydroadiponitrile.

EXAMPLE 13

Into a 1000 ml. Parr Series 4500 Pressure Reactor were placed 33.0 grams (0.13 mole) of iodine, 26.0 grams (0.289 mole) of cuprous cyanide, and 250 ml. of benzene. The reactor was evacuated to approximately 100 mm. and then was pressurized to 3 p.s.i.g. with 0.47 mole of 1,3-butadiene. The reaction mixture was heated to 140° C. over a period of one hour. A temperature of 140° C. to 150° C. was maintained for 3 hours during which time the pressure ranged from 100 p.s.i.g. to 128 p.s.i.g. Filtration of the cooled reaction mixture gave 50.2 grams of powdery cuprous iodide (theory 49.4 grams) and a liquid phase containing 7.35 grams of 1,4-dicyano-2-butene (54%) by GLPC analysis. The solvent was stripped from the liquid phase leaving 11.1 grams of crude dehydroadiponitrile.

EXAMPLE 14

The procedure of Example 13 was followed using carbon tetrachloride as the diluent. The reaction was heated at 125° C. for 3.5 hours. The yield of dinitrile was 80%; approximately 50% of the product was isolated from the carbon tetrachloride solution.

EXAMPLE 15

The procedure of Example 13 was repeated using 33.0 grams (0.13 mole) of iodine, 26.0 grams (0.289 mole) of cuprous cyanide, 0.35 mole of 1,3-butadiene, 90 ml. of chloroform, 80 ml. of n-heptane, and 80 ml. of benzene. The reaction mixture was heated at 130° to 147° C. for a period of 3½ hours developing a maximum pressure of 127 p.s.i.g. From the reaction mixture were isolated 11.2 grams of crude dehydroadiponitrile and 52.4 grams of cuprous iodide as a gray-brown powder. Extraction of the cuprous iodide with hot water gave 0.4 gram of dehydroadiponitrile. GLPC analysis of the crude products indicated 70% purity or a 60% yield.

EXAMPLE 16

The procedure of Example 13 was repeated using a 50/50 blend of heptane and chloroform as the inert diluent. The reaction was heated at 125° C. for 3 hours to give a 70% yield of dinitrile; 90% of the dehydroadiponitrile was recovered from the solvent system.

EXAMPLES 17–23

Examples 17–23 illustrate the separation of the dinitrile from its copper complex by extraction with hot water. The general from its copper complex by extraction with The general procedure was to suspend the complex in the desired amount of water and stir and the suspension at reflux for the desired period of time. The mixture was filtered hot to separate the insoluble cuprous halide. The dinitrile was recovered from the water by removal of water by evaporation at 50° to 60° (14 mm.). Analysis of the isolated product showed that no chemical degradation had occurred during this treatment.

TABLE III

| Example No.[a] | Ml. H2O | Temp., °C. | Time, min. | Grams complex | Grams dinitrile isolated | Percent | Grams CuX recovered |
|---|---|---|---|---|---|---|---|
| 17 | 500 | 100 | 200 | 47.3 | 9.5 | 92 | [b] 37.3 |
| 18 | 500 | 100 | 60 | 47.8 | 8.4 | 81 | [b] 38.0 |
| 19 | 500 | 100 | 120 | 46.6 | 7.0 | 69 | [b] 39.0 |
| 20 | 400 | 100 | 120 | 40.9 | 6.5 | 73 | |
| 21 | 400 | 85 | 200 | 46.9 | 5.8 | 57 | |
| 22 | 100 | 100 | 40 | 46.8 | 4.0 | 40 | |
| 23 | 500 | 100 | 120 | 31.0 | 2.4 | 29 | [c] 28.5 |

[a] Examples 17-22, DAN.2CuI complex; Example 23, DAN.2CuBr complex.
[b] CuI.
[c] CuBr.

EXAMPLE 24

To 44.8 grams of cuprous iodide-dehydroadiponitrile complex was added 250 ml. of chloroform and 21.6 grams of powdered sodium cyanide. The mixture was stirred at 26° for 1 hour and then filtered. From the filtrate was isolated 1 gram of dinitrile. The filter cake was suspended in 250 ml. of chloroform and stirred at 26° for 1 hour. From the filtrate was recovered 2 grams of dinitrile. The filter cake was again added to 250 ml. of chloroform, and the mixture was stirred and refluxed for 2½ hours. The chloroform filtrate was stripped to yield 1.5 grams of dehydroadiponitrile. The total yield of dinitrile was 4.5 grams (46%).

EXAMPLE 25

To 46.6 grams of DAN·2CUI were added 300 ml. of chloroform and 1000 ml. of water containing 21.6 grams of sodium cyanide. This mixture was stirred vigorously for 30 min. at room temperature. The choloform layer was separated and dried over magnesium sulfate. The solvent was stripped to give 8.1 grams of dinitrile. The water layer was extracted with 300 ml. of chloroform to recover 1 gram of dinitrile. The total yield was 9.1 grams (90%). Analysis of the product shows that no degradation had occurred.

EXAMPLE 26

To 31 grams of a mixture of cuprous cyanide and the cuprous bromide-dinitrile complex were added 300 ml. of chloroform and 10.8 grams of sodium cyanide in 500 ml. of water. The mixture was stirred at room temperature for 1 hour. The chloroform solution yielded 3.5 grams of dinitrile; the yield of nitrile was 55% based on the amount of complex (24 grams) present in the initial mixture.

EXAMPLE 27

A mixture of 24.3 grams of DAN·2CuI, 300 ml. of chloroform and 470 ml. of 2% hydrocyanic acid was stirred at room temperature for 2½ hours. From the chloroform solution was isolated 1.6 grams of dinitrile (30%); 19.2 grams of unreacted complex and cuprous cyanide was recovered (theory, 19.4 grams).

EXAMPLE 28

The procedure of Example 27 was repeated using 34.7 grams of a mixture of cuprous cyanide and the DAN·2CuBr complex. The yield of dinitrile was 2 grams (27% based on complex present).

EXAMPLE 29

Into a 1000 ml. Parr Series 4500 Pressure Reactor were placed 58.0 grams (0.26 mole) of cupric bromide, 26.0 grams (0.289 mole) of cuprous cyanide, and 250 ml. of benzene. The reactor was purged with a nitrogen flow and then was pressurized to 11 p.s.i.g. with 1,3-butadiene. The reaction mixture was heated at 140° to 145° C. for 3 hours developing a maximum pressure of 107 p.s.i.g. Filtration of the cooled reaction mixture gave 87.0 grams of tan, powdery solids, a mixture of cuprous bromide-dehydroadiponitrile complex and excess cuprous cyanide (theory, 90.8 grams). A 10.0 grams portion of the solids was sublimed at 165° C. (0.05 mm.) giving 1.2 grams (75%) of dehydroadiponitrile as white crystals.

EXAMPLE 30

The procedure of Example 29 was followed using cholorform as the solvent. The reaction produced 85.6 grams of cuprous bromide-dehydroadiponitrile complex and excess cuprous cyanide as a tan powder. A 10.0 gram portion of the powder was stirred with a mixture of 50 ml. of chloroform and 100 ml. of 2% aqueous hydrogen cyanide at ambient temperature for 1 hour. After filtration, the chloroform layer was separated, dried over magnesium sulfate and stripped of solvent leaving 0.4 gram (25%) of dehydroadiponitrile as pale orange crystals.

EXAMPLE 31

A 35.1 gram mixture of cuprous iodide and cuprous cyanide was produced from the reaction of iodine and cuprous cyanide with 1,3-butadiene in a heptane-chloroform blend. The weight of the mixed salts indicated an 85% cuprous iodide-15% cuprous cyanide composition. The salts were stirred with a mixture of 100 ml. n-heptane, 100 ml. chloroform and 500 ml. of 2% aqueous hydrogen cyanide for 4 hours at ambient temperature. The treated salts, recovered by filtration and dried, weighed 31.8 grams, a loss of 3.3 grams indicating a 19% conversion of the cuprous iodide to cuprous cyanide. Air was bubbled through the filtrate producing an iodine color in the organic layer. The aqueous phase was extracted with chloroform and treated with air several times. The extracts were titrated for iodine with standard thiosulfate, 25.0 mmoles of iodine (I) was found. The aqueous layer was evaporated to dryness under reduced pressure leaving a residue of molecular iodine, 6.5 mmoles of iodine by titration. The total amount of iodine recovered was 95% of the amount calculated for the cuprous iodide to cuprous cyanide conversion.

What is claimed is:

1. A liquid phase process for forming dicyano compounds which comprises reacting a conjugated diolefinic hydrocarbon containing from 4 to about 20 carbon atoms with cuprous cyanide and a halogen source selected from the group consisting of molecular iodine and cupric bromide in the presence of a substantially anhydrous inert diluent selected from the group consisting of $C_1$–$C_4$ chlorinated hydrocarbons, $C_5$–$C_{20}$ paraffinic hydrocarbons and $C_6$–$C_{12}$ aromatic and alkyl substituted aromatic compounds and mixtures thereof wherein the molar ratio of the conjugated diolefins and cuprous cyanide to the halogen source employed is in the range of from about 2:1 to about 100:1, said reaction being conducted at a temperature in the range of from about 25° C. to about 300° C. and at a pressure in the range of from about atmospheric to about 500 p.s.i.g.

2. A continuous liquid phase process for forming dicyano compounds which comprises reacting a conjugated diolefinic hydrocarbon having from 4 to about 12 carbon atoms with a cuprous cyanide and a halogen source selected from the group consisting of molecular iodine and cupric bromide in the presence of a substantially anhydrous inert diluent selected from the group consisting of $C_1$ to $C_4$ chlorinated hydrocarbons, $C_5$ to $C_{20}$ paraffinic hydrocarbons and $C_6$ to $C_{12}$ aromatic and alkyl substituted aromatic compounds and mixtures thereof wherein the molar ratio of said cuprous cyanide and conjugated diolefin to the halogen source employed is in the range of from about 2:1 to about 100:1 at reaction temperatures in the range of from about 25° C. to about 300° C. and at a pressure in the range of from about atmospheric to about 500 p.s.i.g., said reaction being conducted in the substantial absence of water and thereafter recovering a monoolefinic dicyano compound.

3. The process of claim 2 wherein the conjugated diolefin is selected from the group consisting of butadiene, piperylene, isoprene, and cyclopentadiene.

4. The process of claim 2 wherein the halogen source is molecular iodine.

5. The process of claim 2 wherein the halogen source is cupric bromide.

6. The process of claim 3 wherein the inert diluent is selected from the group consisting of benzene, heptane, nonane, cyclohexane, chloroform and carbon tetrachloride.

7. The process of claim 6 wherein the conjugated diolefin is butadiene.

8. The process of claim 7 wherein the halogen source is molecular iodine and the dicyano compound formed is 1,4-dicyanobutene-2.

9. The process of claim 7 wherein the halogen source is cupric bromide and the dicyano compound formed is 1,4-dicyanobutene-2.

References Cited

UNITED STATES PATENTS

| | | | |
|---|---|---|---|
| 2,415,261 | 2/1947 | Rogers | 260—465.8 |
| 2,553,008 | 5/1951 | Sager | 260—465.3 |
| 2,583,984 | 1/1952 | Arthur, Jr. | 260—465.3 |

JOSEPH P. BRUST, Primary Examiner

U.S. Cl. X.R.

260—438.1, 464